United States Patent
Ezell

(10) Patent No.: US 8,943,190 B1
(45) Date of Patent: Jan. 27, 2015

(54) CALL-PROCESSING EVENT-NOTIFICATION SERVER

(75) Inventor: Joel Ezell, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 516 days.

(21) Appl. No.: 11/781,012

(22) Filed: Jul. 20, 2007

(51) Int. Cl.
*G06F 15/173* (2006.01)
*H04L 29/06* (2006.01)
*H04L 29/08* (2006.01)

(52) U.S. Cl.
CPC ....... *H04L 65/1006* (2013.01); *H04L 29/08603* (2013.01)
USPC .......................................... 709/224; 709/223

(58) Field of Classification Search
CPC ....... H04L 67/16; H04L 67/24; H04L 67/125; H04L 63/10; H04L 65/1006; H04L 12/5815; H04L 29/08603; H04L 29/08639
USPC ....................................................... 709/224
See application file for complete search history.

(56) References Cited

U.S. PATENT DOCUMENTS

| 7,369,540 B1 | 5/2008 | Giroti | |
| 2004/0153552 A1* | 8/2004 | Trossen et al. | 709/229 |
| 2006/0294244 A1* | 12/2006 | Naqvi et al. | 709/227 |
| 2007/0124458 A1* | 5/2007 | Kumar | 709/224 |
| 2007/0143858 A1 | 6/2007 | Hearty | |
| 2007/0162567 A1* | 7/2007 | Ding | 709/219 |

* cited by examiner

*Primary Examiner* — Emmanuel L Moise
*Assistant Examiner* — Xiang Yu

(57) ABSTRACT

In a distributed communications network without a central call-processing controller, such as a SIP-based network, an application server collects and reports call-processing events to a client application by dynamically subscribing to events on devices specified by the client application and other devices that enter into communication sessions with those specified devices, and dynamically unsubscribes to events on devices with which the communications sessions have ended.

12 Claims, 2 Drawing Sheets

CALL-PROCESSING EVENT-NOTIFICATION SERVER

TECHNICAL FIELD

This invention relates generally to communications networks and specifically to event-collecting in decentralized distributed networks.

BACKGROUND OF THE INVENTION

Computer-telephony interface (CTI) applications have traditionally communicated with a central call-processing entity, such as a private-branch exchange (PBX), that handles all aspects of call routing, call control, and device control, and that can consequently give them a unified view of all endpoints in the communications system. For example, if an application places a monitor on a device, the central call-processing entity can supply the application with call progress events for all devices on all calls in which the monitored device participates. Or, an application can register with the central call-processing entity to perform routing control for one or more devices, and thus act in substitute capacity for the central call-processing entity to directly receive all call-progress events for those devices.

The Session Initiation Protocol (SIP) is a peer-to-peer protocol that provides signaling and setup for Internet Protocol (IP)-based communications. As such, it requires only a simple core network, with intelligence distributed to the network edge and embedded in endpoints. Communications systems based on the SIP are accompanied by an increasing use of distributed call-process systems wherein no individual call-processing entity is guaranteed to have a view of an entire communication. Applications must therefore find a way of getting their call-control requests to the correct entities, and have a way of getting a unified view of the distributed system.

One approach is to tunnel Computer-Supported Telecommunications Applications (CSTA) information through SIP directly to devices. But this does not provide a unified view of the communications system. A more-popular alternative is to have back-to-back user agent (B2BUA)-style call control wherein the B2BUA is responsible for handling all SIP signaling between both ends of a communication. But most existing back-to-back implementations are based on SIP servlets and not on remote signaling interfaces such as CSTA. Additionally, if a back-to-back-style third-party call-control wants to show a unified view to an application, it has to have every message of every endpoint in the system routed through the B2BUA, which creates scalability issues.

SUMMARY OF THE INVENTION

This invention addresses these and other problems and disadvantages of the prior art. According to one aspect of the invention, an entity—such as an application server, for example—subscribes to notices of events of one or more devices. Illustratively, the entity subscribes to the notices of events of the one or more devices in response to a request to do so from a client application. When it receives a notice of an event of a device whose events it subscribes to, it notifies the client application of the event. It preferably determines whether the event is an end of a communications session, and if so, it unsubscribes to events of devices involved in the session, or at least those devices whose monitoring was not expressly requested by the client application. It further determines whether the event also involves a device other than a device whose events it subscribes to, and if so, it subscribes to notices of events of that device.

The entity provides to a client application a centralized or unifying view of communications involving the device or devices of interest to the client application. The application preferably interacts with the entity in the same way as it has always interacted with a central call-processing controller, and thus remains unaware of the distributed nature of the system wherein control signals and events are exchanged directly so between system endpoints rather than with a central call-processing controller. Rather, the entity interacts with the devices on behalf of the application in order to enable the application to maintain its simple view of the system.

In order to fully monitor a communication, the entity needs to dynamically subscribe to events of only those devices that are involved in that communication, as opposed to statically requiring all devices in the network to send all control signals to the entity. It thus monitors all activity on devices of a subset of the network, and only monitors other devices as necessary. This makes this approach more scalable than a central call-processing controller.

The invention may be implemented as a method, an apparatus for performing the method, or a computer-readable medium containing instructions which, when executed by a computer, cause the computer to perform the method.

BRIEF DESCRIPTION OF THE DRAWING

These and other features and advantages of the invention will become more apparent from considering the following description of an illustrative embodiment of the invention together with the drawing, in which.

DETAILED DESCRIPTION

Figure 1:
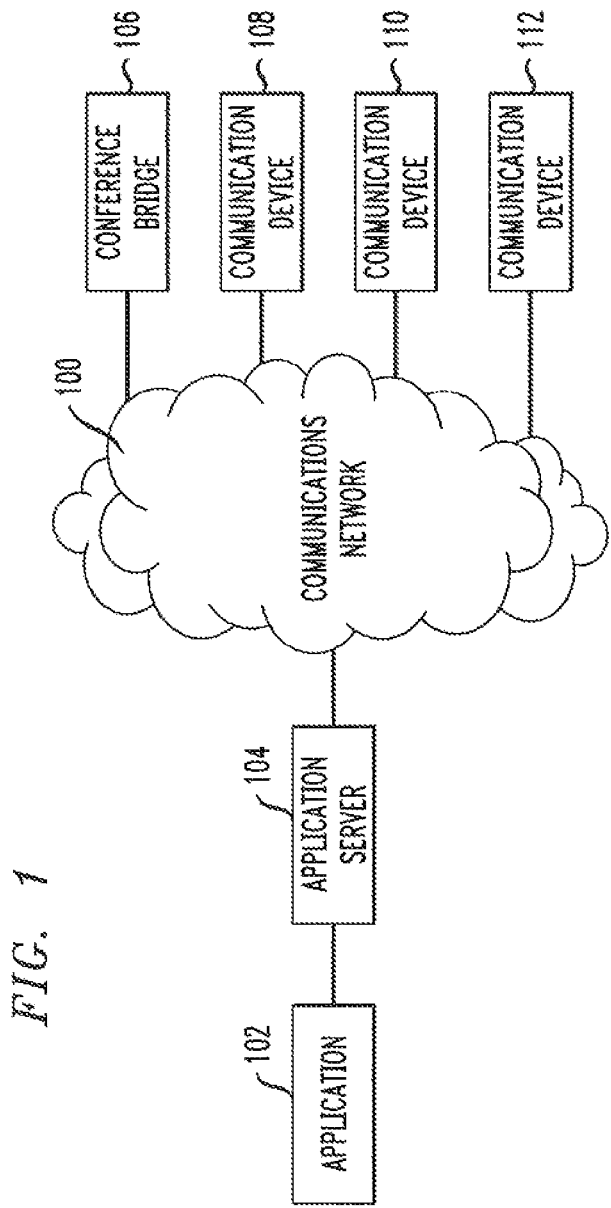
FIG. 1 is a block diagram of a communications system that includes an illustrative embodiment of the invention.

FIG. 1 shows communications system that includes a communications network 100, an application 102, an application server 104, a conference bridge 106, and a plurality of communications devices 108-112. Communications network 100 may be any desired type of network; illustratively, it is a packet-switched communications network such as a local area network (LAN) or the Internet that implements Voice over Internet Protocol (VoIP) communications between devices 106-112. Application 102 may be any desired application that needs to be aware of call-processing, state change, and other events of one or more devices 106-112, and application server 104 gathers that information from devices 106-112 and provides it to application 102. Application 102 and application server 104 illustratively communicate with each other via a CSTA interface. Application server 104 and devices 106-112 illustratively communicate with each other via SIP, with devices 106-112 acting as SIP user agents.

While shown in FIG. 1 as being separate from each other, application 102 and application server 104 may comprise a single entity. Likewise, application 102 and application server 104 are shown as being separate from devices 106-112, but may in fact be integrated with one or more of those devices or any other device or devices of communications network 100. Illustratively, all devices 102-112 are store-program controlled entities each comprising a storage medium storing programs and data, a processor for executing the programs and generating or using the data, and input and output interfaces for communicating with other entities or users. That is to say, the form that devices 102-112 take is unimportant.

Figure 2:
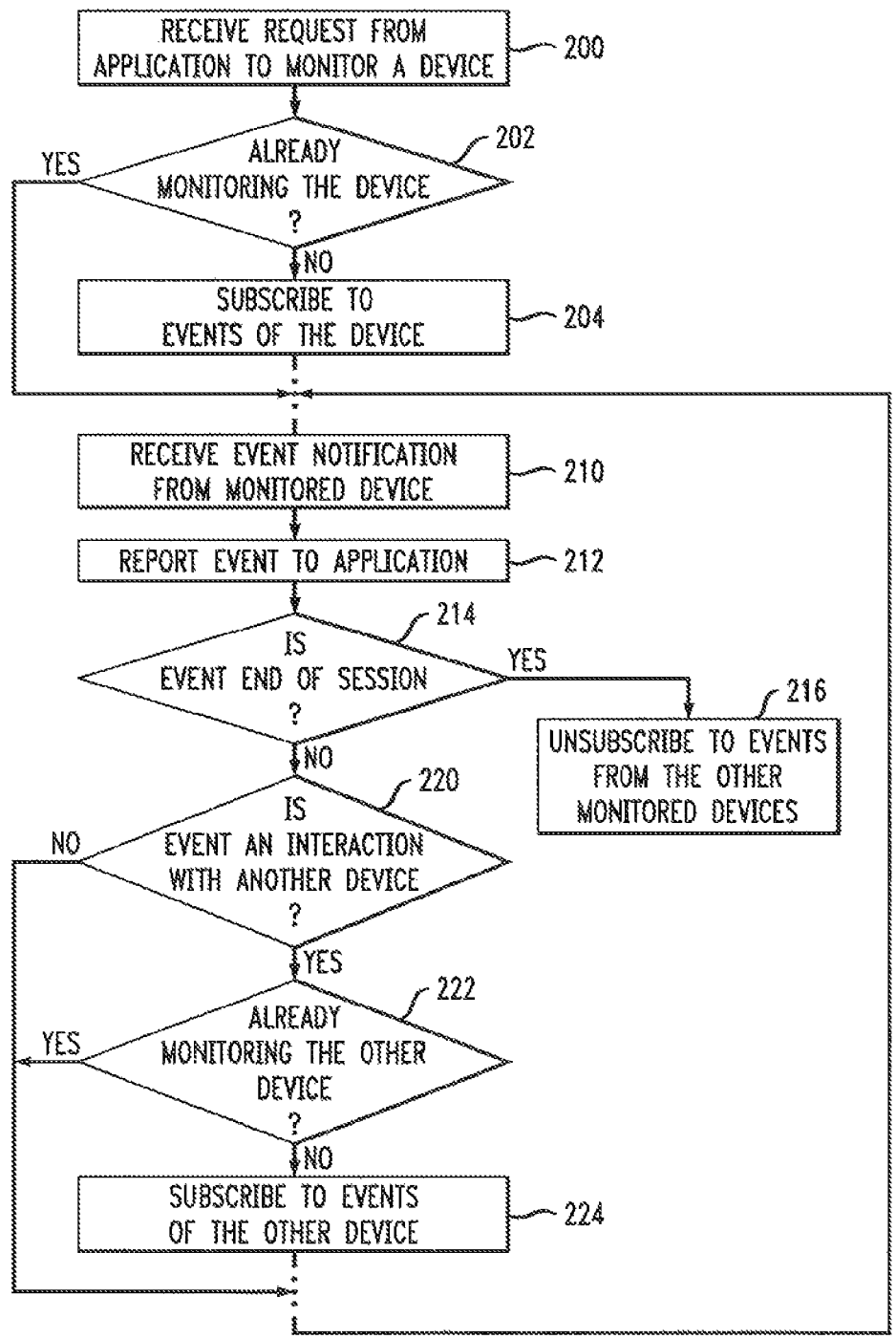
FIG. 2 is a functional flow diagram of an application server of the system of FIG. 1.

The functionality of application server 104 that is relevant to an understanding of this invention is shown in FIG. 2. When application 102 needs to know the call-processing events of a device—of one or more communication devices 108-112, for example—it issues a request to application server 104 to monitor that device. Application server 104 receives the request, at step 200, and checks whether it is already monitoring the device, at step 202. If not, application server 104 subscribes to events of the device, at step 204, illustratively by sending a "subscribe" SIP message to the device. In response, the device will report any and all of its call-processing events to application server 104. Following step 204, if it determines at step 201 that it is already monitor the device, application server 104 awaits receipt of an event notification from the monitored device or devices. Application server 104 does not receive events from devices to whose events it, is not subscribed.

When the monitored device undergoes a call-processing state change—for example, when it initiates a call to or receives a call from another device, such as another one of communication devices 108-112—the monitored device reports the state change to application server 104, illustratively via a "NOTIFY" SIP message. The message identifies the other device or devices. When application server 104 receives the notification, at step 210, it reports the event to application 102, at step 212. Application server 104 then checks if the state change is an end of a communications session, at step 214. If so, application server 104 unsubscribes to events from the monitored devices other than the device that it was requested to monitor at step 200, at step 216, illustratively by sending "UNSUBSCRIBE" SIP messages to those devices. Application server 104 then returns to waiting for receipt of an event notification from the device or devices that it is still monitoring.

If it determines at step 214 that the reported state change is not an end of session, application server 104 checks whether the reported event is an interaction with another device or devices, at step 220. If so, application server 104 checks if it is already monitoring the other device or devices, at step 222. If not, application server 104 subscribes to events of the other device or devices, at step 224. Following step 224, or it if determines at step 222 that it is already monitoring the other device or devices, or if it determines at step 220 that the reported event is not an interaction with another device, application server 104 returns to waiting for receipt of an event notification from one of the devices that it is monitoring.

Assume that two devices—communications devices 108 and 110, for example—are communicating with each other and decide to conference in another device—communication device 112, for example. The devices establish the conference via a conference port of a conference bridge 106 in a conventional manner. In response, device 112 and conference bridge 106 and its port are reported to application server 104 at step 210 as other devices with which the monitored devices are interacting, and so application 104 subscribes to events from device 112 and from the subject port of conference bridge 106, at step 218.

Assume that two devices—communications devices 108 and 110, for example—are communicating with each other and device 108 decides to transfer the communication to another device—communication device 112, for example. Device 108 effects the transfer in a conventional manner. In response, an end of session with device 110 is reported to application server 104 at step 214, causing application server 104 to unsubscribe to events from device 110, at step 216.

Also, device 112 is reported to application server 104 at step 210 as another device with which the monitored devices are interacting, and so application server 104 subscribes to events from device 112, at step 218.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
   subscribing to notices of events of one or more devices;
      wherein subscribing further comprises:
         in response to a request from a client application, sending a SIP "SUBSCRIBE" message to the one or more devices;
         wherein the request from the client application comprises a Computer-Supported Telecommunications Application (CSTA) message;
   receiving a notice of an event of a device whose events are subscribed to;
      wherein receiving further comprises:
         receiving a SIP "NOTIFY" message from the device whose events are subscribed to;
   notifying a client application of the event;
      wherein notifying further comprises:
         sending a CSTA message to the client application;
   determining whether the notice of the event identifies a second device other than the device whose events are subscribed to;
   upon determining that the notice of the event identifies the second device, determining whether notices of events of the second device are subscribed to;
   in response to determining that the notices of events of the second device are not subscribed to, dynamically subscribing to notices of events of the second device;
   upon detecting an initiation of a transfer to a third device, from the device whose events are subscribed to;
   determining whether notices of events of the third device are subscribed to;
   in response to determining that the notices of events of the third device are not subscribed to, dynamically subscribing to notices of events of the third device;
   determining further whether the notice of the event of the device whose events are subscribed to, indicates an end of a communication session between the device whose events are subscribed to and the identified second device; and
   in response to determining that the notice of the event of a device whose events are subscribed to, indicates the end of the communication session, unsubscribing to the notices of the events of the device whose events are subscribed to and the identified second device.

2. The method of claim 1 wherein:
   the notice of the event comprises state changes of the device whose events are subscribed to.

3. The method of claim 1 wherein:
   the notice of the event comprises call-processing events of the device whose events are subscribed to.

4. The method of claim 1 further comprising:
   upon detecting an initiation of a transfer to a fourth device, from the second device whose events are subscribed to;
   determining whether notices of events of the fourth device are subscribed to;

in response to determining that the notices of events of the fourth device are not subscribed to, dynamically subscribing to notices of events of the fourth device;

determining further whether the notice of events of the second device indicates an end of a communication session between the second device whose events are subscribed to and the identified fourth device; and in response to determining that the notice of events of the second device indicates the end of the communication session, unsubscribing to the notices of events of the second device whose events are subscribed and the identified fourth device.

5. A non-transitory computer-readable storage medium storing instructions which, when executed by a computer, causes the computer to perform the steps comprising:

subscribing to notices of events of one or more devices;
  wherein subscribing further comprises:
    in response to a request from a client application, sending a SIP "SUBSCRIBE" message to the one or more devices;
    wherein the request from the client application comprises a Computer-Supported Telecommunications Application (CSTA) message;

receiving a notice of an event of a device whose events are subscribed to;
  wherein receiving further comprises:
    receiving a SIP "NOTIFY" message from the device whose events are subscribed to;

notifying a client application of the event;
  wherein notifying further comprises:
    sending a CSTA message to the client application;

determining whether the notice of the event identifies a second device other than the device whose events are subscribed to;

upon determining that the notice of the event identifies the second device, determining whether notices of events of the second device are subscribed to;

in response to determining that the notices of events of the second device are not subscribed to, dynamically subscribing to notices of events of the second device;

upon detecting an initiation of a transfer to a third device, from the device whose events are subscribed to;

determining whether notices of events of the third device are subscribed to;

in response to determining that the notices of events of the third device are not subscribed to, dynamically subscribing to notices of events of the third device;

determining further whether the notice of the event of the device whose events are subscribed to, indicates an end of a communication session between the device whose events are subscribed to and the identified second device; and in response to determining that the notice of the event of a device whose events are subscribed to, indicates the end of the communication session, unsubscribing to the notices of the events of the device whose events are subscribed to and the identified second device.

6. The non-transitory computer-readable storage medium of claim 5, storing instructions which, when executed by a computer, causes the computer to further perform the steps wherein:

the notice of the event comprise state changes of the device whose events are subscribed to.

7. The non-transitory computer-readable storage medium of claim 5, storing instructions which, when executed by a computer, causes the computer to further perform the steps wherein:

the notice of the event comprises call-processing events of the device whose events are subscribed to.

8. The non-transitory computer-readable storage medium of claim 5, storing instructions which, when executed by a computer, causes the computer to further perform the steps wherein:

upon detecting an initiation of a transfer to a fourth device, from the second device whose events are subscribed to;

determining whether notices of events of the fourth device are subscribed to;

in response to determining that the notices of events of the fourth device are not subscribed to, dynamically subscribing to notices of events of the fourth device;

determining further whether the notice of events of the second device indicates an end of a communication session between the second device whose events are subscribed to and the identified fourth device; and in response to determining that the notice of events of the second device indicates the end of the communication session, unsubscribing to the notices of events of the second device whose events are subscribed and the identified fourth device.

9. An application server for providing notices of events of a plurality of devices, comprising:

the application server comprising a hardware processor adapted for subscribing to the notices of the events of one or more of a plurality of devices;
  wherein subscribing further comprises:
    in response to a request from a client application, sending a SIP "SUBSCRIBE" message to the one or more devices;
    wherein the request from the client application comprises a Computer-Supported Telecommunications Application (CSTA) message;

receiving a notice of an event of a device whose events are subscribed to;
  wherein receiving further comprises:
    receiving a SIP "NOTIFY" message from the device whose events are subscribed to;

notifying a client application of an event in response to receiving a notice of the event of the device whose events are subscribed to;
  wherein notifying further comprises:
    sending a CSTA message to the client application;

determining whether the notice of the event identifies a second device other than the device whose events are subscribed to;

upon determining that the notice of the event identifies the second device, determining whether notices of events of the second device are subscribed to;

in response to determining that the notices of events of the second device are not subscribed to, dynamically subscribing to notices of events of the second device;

upon detecting an initiation of a transfer to a third device, from the device whose events are subscribed to;

determining whether notices of events of the third device are subscribed to;

in response to determining that the notices of events of the third device are not subscribed to, dynamically subscribing to notices of events of the third device;

determining further whether the notice of the event of the device whose events are subscribed to, indicates an end of a communication session between the device whose events are subscribed to and the identified second device; and in response to determining that the notice of the event of a device whose events are subscribed to, indicates the end of the communication session, unsubscribing to the notices of the events of the device whose events are subscribed to and the identified second device.

10. The application server of claim 9, wherein the notice of the event comprises state changes of the device whose events are subscribed to.

11. The application server of claim 9, wherein the notice of the event comprises call-processing events of the device whose events are subscribed to.

12. The application server of claim 9, wherein:

upon detecting an initiation of a transfer to a fourth device, from the second device whose events are subscribed to;

determining whether notices of events of the fourth device are subscribed to;

in response to determining that the notices of events of the fourth device are not subscribed to, dynamically subscribing to notices of events of the fourth device;

determining further whether the notice of events of the second device indicates an end of a communication session between the second device whose events are subscribed to and the identified fourth device; and in response to determining that the notice of events of the second device indicates the end of the communication session, unsubscribing to the notices of events of the second device whose events are subscribed and the identified fourth device.

\* \* \* \* \*